US012761944B2

(12) United States Patent
Shenoy et al.

(10) Patent No.: US 12,761,944 B2
(45) Date of Patent: Oct. 13, 2026

(54) API-BASED VIRTUAL CONSOLE

(71) Applicant: Dell Products L.P., Round Rock, TX (US)

(72) Inventors: Ajay Shenoy, Bangalore (IN); Rajeshkumar Ichchhubhai Patel, Bangalore (IN); Jitendra Kumar, Bangalore (IN); Hiren Kishorbhai Pitroda, Rajkot (IN); Venkataragavan Vijayakumar, Bangalore (IN); Rahul Parmani, Bangalore (IN); Devadath Vijay, Kozhikode (IN); Julian Jossen, Thrissur (IN); Yashita Goswami, Indore (IN)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 18/648,478

(22) Filed: Apr. 29, 2024

(65) Prior Publication Data

US 2025/0335229 A1 Oct. 30, 2025

(51) Int. Cl.
*G06F 9/455* (2018.01)
*H04L 67/02* (2022.01)

(52) U.S. Cl.
CPC .......... *G06F 9/45558* (2013.01); *H04L 67/02* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,650,494 | B1 * | 2/2014 | Sampath | G06F 3/01 715/740 |
| 10,824,486 | B1 * | 11/2020 | Chandrasekhar | G06F 9/543 |
| 2015/0229509 | A1 * | 8/2015 | Castine | H04L 41/046 709/208 |
| 2020/0233707 | A1 * | 7/2020 | Ramamurthy | G06F 9/5066 |
| 2021/0334120 | A1 * | 10/2021 | Cheng | G06F 13/4282 |
| 2022/0114027 | A1 * | 4/2022 | Puthillathe | G06F 13/387 |
| 2024/0103881 | A1 * | 3/2024 | Li | G06F 9/4406 |
| 2024/0370318 | A1 * | 11/2024 | Rose | G06F 13/4282 |

FOREIGN PATENT DOCUMENTS

| | | | | | |
|---|---|---|---|---|---|
| CN | 109167790 | A | * | 1/2019 | H04N 21/8166 |
| CN | 208739148 | U | * | 4/2019 | |
| CN | 115834918 | A | * | 3/2023 | |
| CN | 114363226 | B | * | 4/2024 | H04L 43/50 |

* cited by examiner

*Primary Examiner* — Olabode Akintola
(74) *Attorney, Agent, or Firm* — Jackson Walker L.L.P.

(57) ABSTRACT

Disclosed systems and methods enable a RESTful API server, e.g., a Redfish server, provisioned with virtual console resources running on a system management resource, e.g., a BMC, of an information handling system, to perform virtual console operations. The virtual console features include a virtual video feature for relaying frame buffers of video data, corresponding to video output from a host application, to a RESTful API client. The virtual console features may further include virtual keyboard and mouse features, which may be collectively referred to herein as virtual HID features, for relaying keyboard and mouse data, indicative of keyboard scan codes, mouse x, y coordinates, and mouse activity, e.g., Right Click, Left Click, etc., generated by a user of the RESTful API client.

20 Claims, 2 Drawing Sheets

API-BASED VIRTUAL CONSOLE

TECHNICAL FIELD

The present disclosure pertains to information handling system management and, more particularly, remote management of such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server class information handling systems often include a dedicated component, device, module, or other type of resource that enables remote system management in which an IT administrator or the like manages a remotely-located, network-connected system referred to herein as the client system or, more simply, the client. This management resource may be implemented as a baseboard management component (BMC). The integrated Dell Remote Access Controller (iDRAC) from Dell Technologies is widely distributed example of such a BMC. Among many other functions and features, a BMC may include or support a remote viewing function that enables an IT administrator to view client video, i.e., view the display being rendered on the display screen of a managed system, and interact with the managed system via keyboard and mouse inputs. Generally, such remote viewers are implemented as Hypertext Markup Language (HTML) based graphical user interfaces (GUIs). Unfortunately, an HTML-based viewer may require a Web browser running on the managed system and/or physical access to the managed system.

SUMMARY

Limitations of existing remote viewing resources are addressed by a disclosed REST-compliant API-based service, such as a Redfish service provisioned with visual console resources including virtual keyboard, video, and mouse resources disclosed herein. In at least some embodiments, a disclosed RESTful API video resource periodically captures frame buffers generated by a virtual console coupled to an OS application. The RESTful API video resource may be enabled to relay the captured frames to a RESTful API client as an event stream. Disclosed teachings further encompass a virtual keyboard feature provisioned, in at least some embodiments, to present an enable property that, when asserted or active, causes a virtual USB keyboard to be enumerated and coupled to the host. The virtual keyboard feature may also expose a SendKeyCode ( ) action for communicating keyboard scan codes (KSCs) to the virtual USB keyboard, thereby effectively enabling means for providing remote keystrokes to the virtual console or the host system. The RESTful API service may further include a virtual mouse feature provisioned to present an enable property for enabling/disabling a virtual USB mouse device. When the enable property is on or active, a virtual USB is enumerated and attached to the client. The virtual mouse URI feature may present actions for sending mouse information to the virtual USB mouse. The virtual mouse actions may include a mouse coordinate action and a mouse activity action.

In this manner, subject matter disclosed herein teaches RESTful API-based access to a virtual console that will facilitate browser-free end-user applications, i.e., applications that are not tied to or otherwise dependent on a web browser. API-based automation that runs on the client without having physical access to the client can also be built by injecting commands directly into the host including, as one non-limiting example, interactive scripts for installing an operating system (OS). Accordingly, disclosed methods and systems provide API-based automation that runs on the client without having physical access to the client and enables browser-independent end user applications, i.e., applicants that do not require a web browser to run.

Accordingly, in at least one aspect, disclosed systems and methods enable a RESTful API server, e.g., a Redfish server, provisioned with virtual console resources running on a system management resource, e.g., a BMC, of an information handling system, to perform virtual console operations. The virtual console features include a virtual video feature for relaying frame buffers of video data, corresponding to video output from a host application, to a RESTful API client. The virtual console features may further include virtual keyboard and mouse features, which may be collectively referred to herein as virtual HID features, for relaying keyboard and mouse data, indicative of keyboard scan codes, mouse coordinates, and mouse activity, e.g., RClick, LClick, etc., generated by a user of the RESTful API client.

In Redfish embodiments, the RESTful API client comprises a Redfish client and the RESTful API server comprises a Redfish server, which is accessible to the Redfish client via a standard service root URI such as . . . /redfish/v1. In at least some of these embodiments, the virtual console operations are enabled by one or more Redfish resources corresponding to one or more resource URIs. The Redfish resources may include a virtual console resource configured capture frame buffers of host video and relay captured frame buffers within a Redfish event stream. Such frame buffers may be attached to a Redfish event as a Base64 encoded payload in an OEM section of the event.

Redfish resources may include a virtual USB keyboard resource configured to present a SendKeyCode action enabling the Redfish client to send a keyboard scan code (KSC) within a SendKeyCode (KSC) API call to the virtual console or the host. The virtual USB keyboard resource may be configured to present an enable property for enabling and disabling the virtual USB keyboard device.

Redfish resources may further include a virtual mouse resource configured to present a SendMouseCoordinates action enabling the Redfish client to send mouse coordinates within a SendMouseCoordinates (x, y) API call. The virtual mouse resource may present a SendMouseActivity action enabling the Redfish client to send a mouse activity indication within a SendMouseActivity (RClk, LClk, etc.) API call. The virtual mouse resource is configured to present an Enable property for enabling and disabling the virtual mouse resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
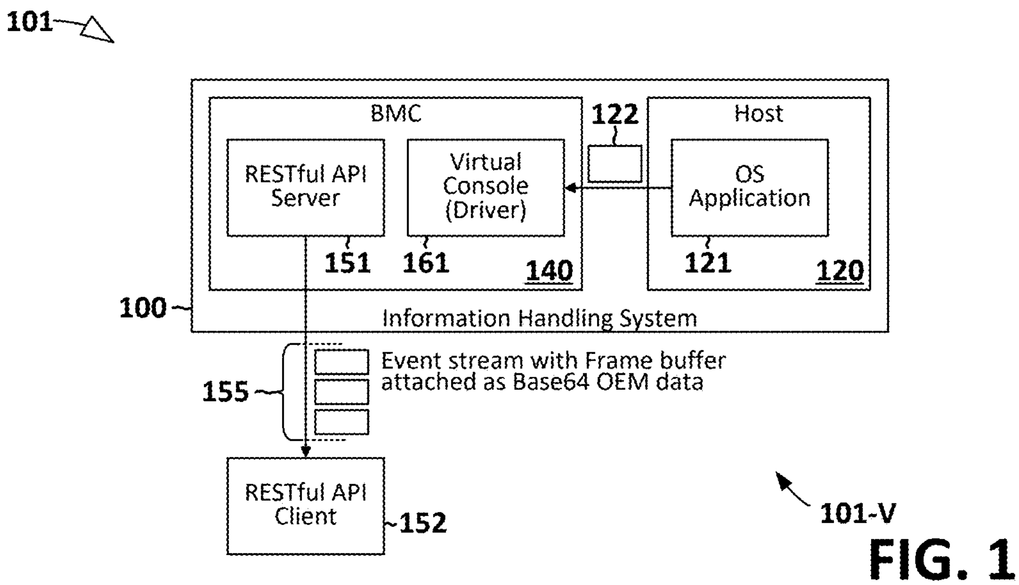
FIG. 1 illustrates an exemplary API-based virtual video implementation in accordance with disclosed subject matter.
Figure 2:
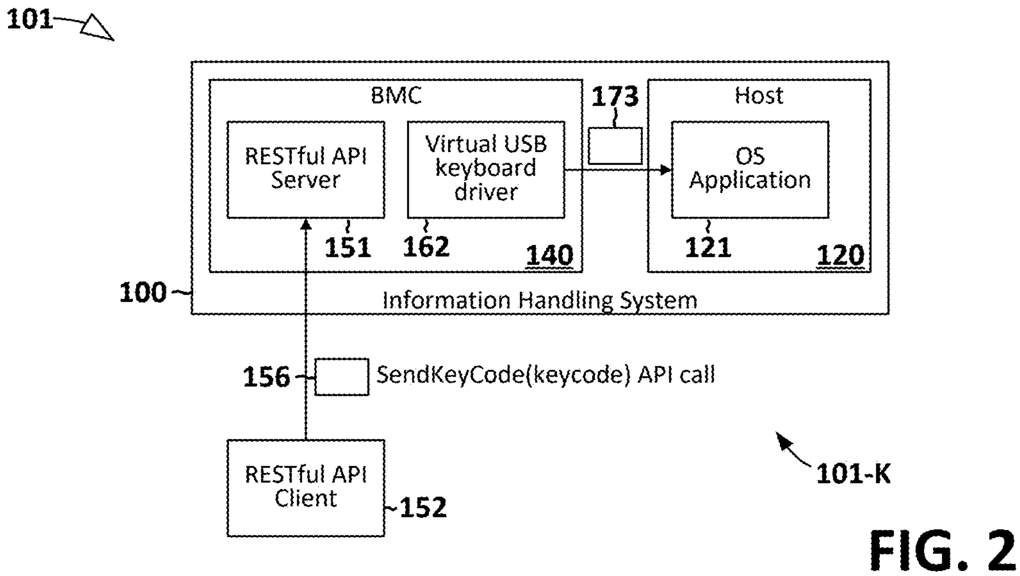
FIG. 2 illustrates an exemplary API-based virtual keyboard implementation in accordance with disclosed subject matter.
Figure 3:
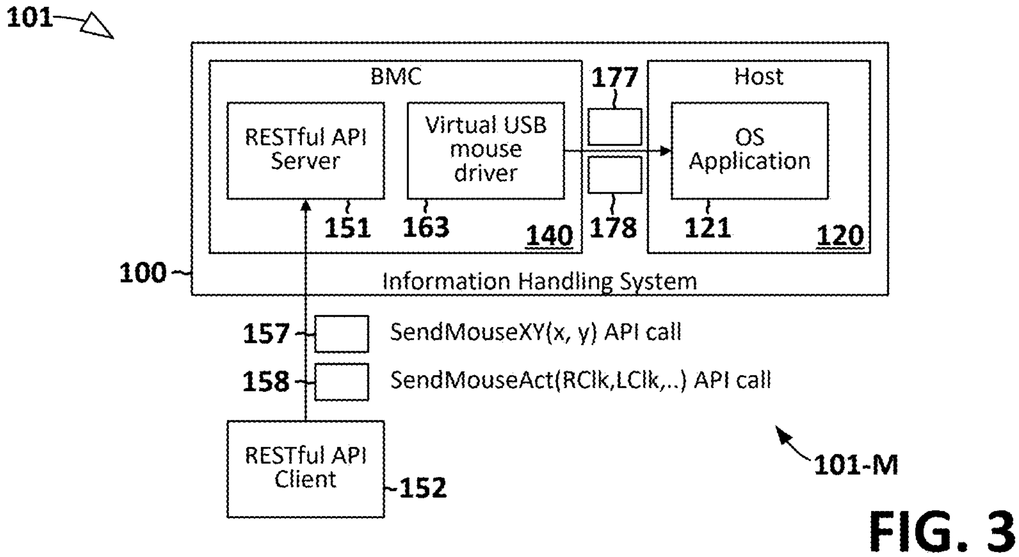
FIG. 3 illustrates an exemplary API-based virtual mouse implementation in accordance with disclosed subject matter.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIGS. 1-3 illustrate, respectively, a video component 101-V, a keyboard component 101-K, and a mouse component 101-M of an exemplary API-based virtual console 101 providing a browser-less solution enabling a remote user to receive video output from and provide keyboard and mouse input to a managed system.

Each component of the API-based virtual console 101 illustrated in FIGS. 1-3 is implemented in an information handling system 100 communicatively coupled to a RESTful API client 152. The information handling system 100 depicted in FIGS. 1-3 includes a host system, referred to simply as host 120, and a system management resource in the form of a baseboard management component (BMC) 140. The host 120 is depicted running an OS application 121 while the BMC 140 is running a RESTful API server 151 configured to provide a RESTful API service encompassing one or more resources including one or more virtual video resources.

In at least some embodiments referred to herein as Redfish embodiments, the RESTful API components of virtual console 101 are implemented as Redfish-compliant components. In such embodiments, RESTful API server 151 may be referred to as Redfish API server or, more simply, Redfish server and, similarly, RESTful API client 152 may be referred to as Redfish API client or Redfish server. In Redfish embodiments, the Redfish server provides a Redfish-compliant service, commonly referred to by its Redfish-compliant service root URI, . . . /redfish/v1 service by a encompassing one or more Redfish-compliant features including one or more Redfish-compliant virtual video resources.

Referring specifically to FIG. 1, the depicted video component 101-V of API-based virtual console 101 includes a virtual video driver 161 running on BMC 140. The virtual video driver 161 depicted in FIG. 1 is coupled to OS application 121 and configured to receive video output 122 generated by OS application 121. In at least some embodiments, virtual video driver 161 is configured to produce video data in the form of one or more frame buffers. In such embodiments, RESTful API server 151 may be configured to capture frame buffers produced by virtual video driver 161 and forward captured frame buffers to RESTful API clients such as the RESTful API client 152. In at least one Redfish embodiment, RESTful API server 151 may forward frame buffers to RESTful API client 152 as a sequence or stream 155 of one or more Redfish event messages. As an example, each frame buffer may be attached to a corresponding event as a base64 encoded payload in an OEM section of the each event.

RESTful API client 152 may be configured to handle such events and extract the OEM payload, i.e., the frame buffer and render the extracted frame buffer(s) using any suitable front end application in any suitable programming language, including, as non-limiting examples, Python, C+, Java, etc. In some embodiments, RESTful API client 152 may be able to control the event rate, i.e., the rate or frequency at which events are generated, accommodate varying network bandwidths.

Referring now to FIG. 2, the illustrated virtual keyboard component 101-K of API-based virtual console 101 includes a virtual keyboard resource corresponding to a virtual USB keyboard driver 162. In Redfish-compliant embodiments, the virtual keyboard resource may be accessible to RESTful API client 152 via a Redfish URI such as . . . /redfish/v1/VirtualKeyboard. The virtual keyboard service may present an Enable property that can be used to enable/disable a virtual USB Keyboard device. In at least some embodiments, enabling the virtual USB keyboard causes a virtual USB-Keyboard device to be enumerated and attached to RESTful API client 152. The virtual keyboard resource may also present a SendKeyCode ( ) action that enables RESTful API client 152 to send keyboard scan codes 156 to virtual USB keyboard driver 162, which may then send corresponding keystroke information 173 to the virtual console or the client to which the keyboard is attached. After sending keyboard scan codes, the virtual keyboard board service can be disabled by the user by changing the Enable attribute to False.

Turning now to FIG. 3, the illustrated virtual mouse component 101-M of API-based virtual console 101 includes a virtual mouse resource corresponding to a virtual USB mouse driver 163. In Redfish-compliant embodiments, the virtual mouse resource may be accessible to RESTful API client 152 via a Redfish URI such as . . . /redfish/v1/VirtualMouse. Like the virtual keyboard resource discussed above, the virtual mouse resource may present an Enable property for enabling/disabling a Virtual USB Mouse device wherein enabling the Virtual USB Mouse device may cause a virtual USB-Mouse device to be enumerated and attached to the client. The virtual mouse resource may also present a SendMouseXY (x, y) action and a SendMouseActs (RClk, LClk, etc.) action suitable for sending mouse coordinates 157 and mouse actions 158, e.g., clicks, scroll, etc., to virtual USB mouse driver 163. This causes mouse coordinate and click action information 177, 178 to be sent to the virtual console or the host to which the virtual mouse is attached. After sending the mouse co-ordinates and actions, the virtual mouse can be disabled by changing the Enable attribute to False.

Figure 4:
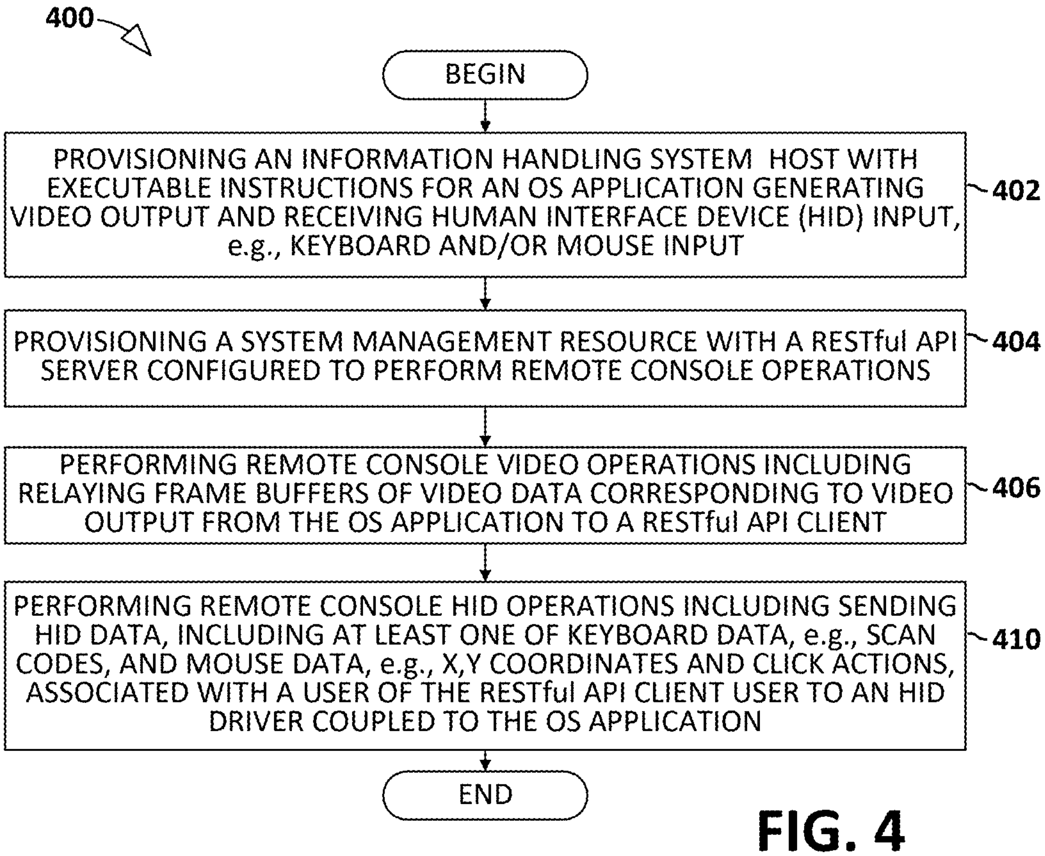
FIG. 4 illustrates a flow diagram of an API-based virtual console method in accordance with disclosed subject matter.

Referring to FIG. 4, a flow diagram of API-based virtual console method 400 is depicted. The method 400 depicted in FIG. 4 includes provisioning (step 402) an information handling system host, including a CPU and system memory with executable instructions for an OS application, generating video output and receiving input from a keyboard, mouse, or other type of HID. The illustrated method 400 further includes provisioning (step 404) a system management resource, e.g., a BMC or the like, with a RESTful API server configured to perform virtual console operations. Performing virtual console operations may include performing (step 406) video operations including relaying frame buffers of video data, corresponding to video output from the OS application, to a RESTful API client and performing (step 410) HID operations for sending HID data, including keyboard data, e.g., scan codes, and mouse data, e.g., x, y coordinates and click actions, associated with a user of the RESTful API client user to a keyboard driver, mouse driver, or other type of HID driver coupled to the host.

Figure 5:
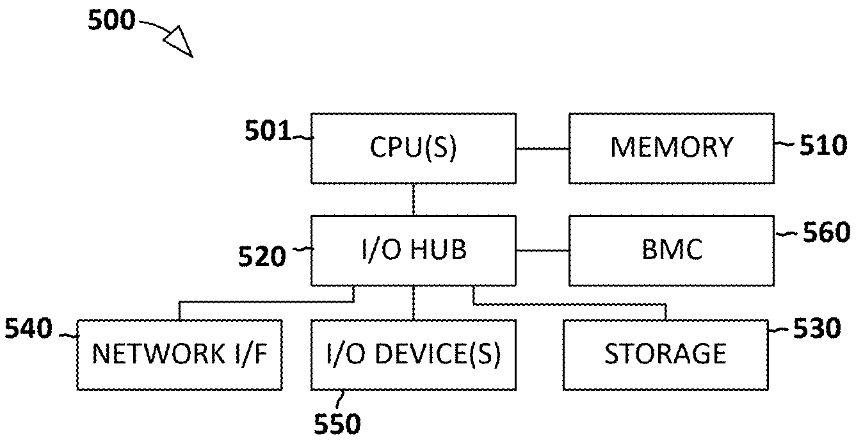
FIG. 5 illustrates an information handling system suitable for use in conjunction with systems and methods disclosed in FIGS. 1-4.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a BMC 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising virtual console operations performed by a representational state transfer (REST) compliant (RESTful) application programming interface (API) server running on a system management resource of an information handling system, the virtual console operations comprising: a host including a CPU and host memory including executable instructions for a host application; and a system management resource including a RESTful server configured to perform virtual console operations including:

relaying frame buffers of video data corresponding to video output from the host application to a RESTful API client; and relaying human interface data indicative of keyboard or mouse actions performed by a user of the RESTful API client to a human interface driver coupled to the host application.

2. The method of claim 1, wherein the RESTful server is accessible to the RESTful API client via a service root URI.

3. The method of claim 1, wherein:

the RESTful server comprises a Redfish server;

the RESTful API client comprises a Redfish client; and the virtual console operations are enabled by one or more Redfish resources corresponding to one or more resource URIs.

4. The method of claim 3, wherein the one or more Redfish resources include a virtual video resource configured to capture frame buffers as Redfish event streams.

5. The method of claim 1, wherein the Redfish event stream encompasses a particular event associated with a particular frame buffer and wherein the video resource is configured to attach a particular frame buffer as a Base64 encoded payload in an OEM section of the event.

6. The method of claim 3, wherein the one or more Redfish resources include a virtual USB keyboard resource configured to present a SendKeyCode action enabling the Redfish client to send a keyboard scan code (KSC) within a SendKeyCode (KSC) API call to the virtual console or the host.

7. The method of claim 6, wherein the virtual USB keyboard resource is configured to present an enable property for enabling and disabling the virtual USB keyboard device.

8. The method of claim 3, wherein the one or more Redfish resources include a virtual mouse resource configured to:

present a SendMouseCoordinates action enabling the Redfish client to send mouse coordinates within a SendMouseCoordinates (x, y) API call; and present a SendMouseActivity action enabling the Redfish client to send a mouse activity indication within a SendMouseActivity (right click, left click) API call.

9. The method of claim 8, wherein the virtual mouse resource is configured to present an Enable property for enabling and disabling the virtual mouse resource.

10. The method of claim 3, wherein the management resource comprises a baseboard management controller.

11. An information handling system, comprising:

a host including a CPU and host memory including executable instructions for a host application; and a system management resource including a representational transfer state (REST) compliant (RESTful) application programming interface (API) server configured to perform virtual console operations including:

relaying frame buffers of video data corresponding to video output from the host application to a RESTful API client; and relaying human interface data indicative of keyboard or mouse actions performed by a user of the RESTful API client to a human interface driver coupled to the host application.

12. The information handling system of claim 11, wherein the RESTful server is accessible to the RESTful API client via service root URI.

13. The information handling system of claim 11, wherein:

the RESTful server comprises a Redfish server;

the RESTful API client comprises a Redfish client; and the virtual console operations are enabled by one or more Redfish resources corresponding to one or more resource URIs.

14. The information handling system of claim 13, wherein the one or more Redfish resources include a virtual video resource configured to capture frame buffers as Redfish event streams.

15. The information handling system of claim 11, wherein the Redfish event stream encompasses a particular event associated with a particular frame buffer and wherein the video resource is configured to attach a particular frame buffer as a Base64 encoded payload in an OEM section of the event.

16. The information handling system of claim 13, wherein the one or more Redfish resources include a virtual USB keyboard resource configured to present a SendKeyCode action enabling the Redfish client to send a keyboard scan code (KSC) within a SendKeyCode (KSC) API call to the virtual console or the host.

17. The information handling system of claim 16, wherein the virtual USB keyboard resource is configured to present an enable property for enabling and disabling the virtual USB keyboard device.

18. The information handling system of claim 13, wherein the one or more Redfish resources include a virtual mouse resource configured to:

present a SendMouseCoordinates action enabling the Redfish client to send mouse coordinates within a SendMouseCoordinates (x, y) API call; and present a SendMouseActivity action enabling the Redfish client to send a mouse activity indication within a SendMouseActivity (right click, left click) API call.

19. The information handling system of claim 18, wherein the virtual mouse resource is configured to present an Enable property for enabling and disabling the virtual mouse resource.

20. The information handling system of claim 13, wherein the management resource comprises a baseboard management controller.

* * * * *